(12) United States Patent
Hamamoto et al.

(10) Patent No.: US 7,932,660 B2
(45) Date of Patent: Apr. 26, 2011

(54) ULTRASONIC MOTOR

(75) Inventors: Masaki Hamamoto, Osaka (JP);
Teruhisa Kotani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 96 days.

(21) Appl. No.: 12/463,195

(22) Filed: May 8, 2009

(65) Prior Publication Data
US 2009/0278421 A1    Nov. 12, 2009

(30) Foreign Application Priority Data

May 12, 2008  (JP) ................................. 2008-124843

(51) Int. Cl.
*H02N 2/00* (2006.01)
(52) U.S. Cl. ......... 310/323.09; 310/323.01; 310/323.02; 310/323.05; 310/323.06; 310/323.08; 310/323.13
(58) Field of Classification Search ........... 310/323.01–323.06, 323.08, 323.09, 310/323.13, 323.14, 323.17, 323.18
See application file for complete search history.

(56) References Cited

U.S. PATENT DOCUMENTS

| | | | | |
|---|---|---|---|---|
| 4,019,073 | A * | 4/1977 | Vishnevsky et al. | 310/322 |
| 6,266,296 | B1 * | 7/2001 | Miyazawa | 368/28 |
| 6,617,759 | B1 * | 9/2003 | Zumeris et al. | 310/323.17 |
| 6,867,532 | B2 * | 3/2005 | Brady et al. | 310/323.02 |
| 7,075,212 | B2 * | 7/2006 | Witteveen | 310/323.02 |
| 2008/0297002 | A1 * | 12/2008 | Oki et al. | 310/323.16 |

FOREIGN PATENT DOCUMENTS

| | | | | |
|---|---|---|---|---|
| JP | 2-41672 | A | * | 2/1990 |
| JP | 4-200283 | A | * | 7/1992 |
| JP | 06-189569 | | * | 7/1994 |
| JP | 2005-328697 | A | * | 11/2005 |
| JP | 2007-106393 | A | | 4/2007 |

OTHER PUBLICATIONS

Matsunaga, Y. et al., "An In-wheel type micro ultrasonic motor using sector-shaped Piezoelectric Ceramics Vibrators" Thesis Committee for the Symposium on the Basics and Applications of Ultrasonic Electronics, Proceedings of the 27th Symposium on the Basics and Application Electronics, Nov. 15, 2006, vol. 27, pp. 489-490.
Kanda, T. et al., "A Micro Ultrasonic Motor Using Sector -shaped Piezoelectric Vibrators and a low-profile Preload Mechanism", Japan Society of Mechanical Engineers, Robotics and Mechatronics Division, Proceedings of the JSME Conference on Robotics and Mechatronics, May 10-12, 2007, pp. 1A2-B01.

* cited by examiner

*Primary Examiner* — Thomas M Dougherty
(74) *Attorney, Agent, or Firm* — Birch, Stewart, Kolasch & Birch, LLP

(57) ABSTRACT

An ultrasonic motor has a cylindrical rotor for performing a mechanical output, a plurality of ultrasonic vibrators each having two points in internal contact with the rotor, and a preload mechanism for pressing the ultrasonic vibrators from an inside toward an outside of the rotor, and the ultrasonic vibrators are provided to be rotatable relative to the preload mechanism. With this configuration, an internal contact type ultrasonic motor capable of performing efficient drive by using a plurality of ultrasonic vibrators each in contact with a cylindrical rotor at two points and allowing contact at all contact points without requiring a high machining accuracy can be provided.

8 Claims, 15 Drawing Sheets

DIRECTION OF VIBRATION

DIRECTION OF VIBRATION

ULTRASONIC MOTOR

This nonprovisional application is based on Japanese Patent Application No. 2008-124843 filed on May 12, 2008 with the Japan Patent Office, the entire contents of which are hereby incorporated by reference.

BACKGROUND OF THE INVENTION

1. Field of the Invention

The present invention relates to an ultrasonic motor.

2. Description of the Background Art

Piezoelectric elements made of such as PZT (Lead Zirconate Titanate) can store large mechanical energy per unit volume, and small-sized high-power actuators using the same have been put to practical use. These are generally called as ultrasonic motors. In the following, a basic operation of a resonance ultrasonic motor will be described.

Ultrasonic motors of a type obtaining an elliptical motion by exciting a plurality of vibration modes having an identical resonance frequency in a piezoelectric element and moving a driven body by friction have been under study for a long time. For example, FIG. 10 shows an ultrasonic motor described in Japanese Patent Laying-Open No. 2007-106393. FIG. 11 shows details of an ultrasonic vibrator 121 disclosed in Japanese Patent Laying-Open No. 2007-106393.

Ultrasonic vibrator 121 has a vertically mirror-symmetric structure formed by sandwiching a reinforcing stainless plate 1211 between two piezoelectric elements 1212 and 1213. Ultrasonic vibrator 121 in the shape of a rectangular flat plate has substantially identical resonance frequencies for a first expansion/contraction vibration mode in an in-plane direction shown in FIG. 12 and a second bending vibration mode in an in-plane direction shown in FIG. 13.

On piezoelectric elements 1212 and 1213, electrodes 1216 and 1217 each divided into four are arranged. Electrodes located at opposing corners of electrodes 1216 and 1217 are respectively connected by wires. Alternating voltages φA, φB having phases 90° different from each other are applied to these two sets of electrodes, respectively.

Thus, the two vibration modes described above are excited by alternating voltages φA, φB with the phases being shifted by 90°, in the order of A, B, C, and D shown in FIG. 14. Thereby, an elliptical motion is generated at a tip portion of ultrasonic vibrator 121. If the tip portion is pressed against a driven body, the driven body is moved by a frictional force. This pressing force is generally referred to as a "preload".

As a technique for applying the preload, Japanese Patent Laying-Open No. 2007-106393 proposes a configuration of holding ultrasonic vibrator 121 using a support projection 1214 that rotates about a shaft 127, and pulling a pulled portion 1224 provided on an opposite side surface thereof by an elastic body 129 wrapped around a pole 112, as shown in FIG. 10. Further, a ceramic contact portion 1215 is provided at a point of stainless plate 1211, and a sector-shaped rotor 122 is provided to a rotor shaft 124 via a bearing 123 to be rotatable only about an axis of rotor shaft 124.

Furthermore, an internal contact type ultrasonic motor is disclosed in a document described below, and FIG. 15 shows a structure thereof.

Yusuke Matsunaga, et al., "An In-wheel Type Micro Ultrasonic Motor Using Sector-shaped Piezoelectric Ceramics Vibrators", issued by the Thesis Committee for the Symposium on the Basics and Applications of Ultrasonic Electronics, Proceedings of the "27th Symposium on the Basics and Applications of Ultrasonic Electronics", Nov. 15, 2006, pp. 489-490.

Provided is a four-point contact type ultrasonic motor using two ultrasonic vibrators 21. The ultrasonic motor has a configuration in which point portions of ultrasonic vibrators 21 and 22 having the same configuration as that described above are brought into internal contact with a cylindrical rotor 1 under a preload by means of a central pantograph type preload mechanism 3.

As shown in FIG. 16, each point P has an elliptical motion trajectory, and thereby drive forces exerted in the same direction can be obtained at all points P. Further, a four-point contact type ultrasonic motor using sector-shaped ultrasonic vibrators that utilizes similar vibration modes is described in a document described below.

Takefumi Kanda, et al., "A Micro Ultrasonic Motor Using Sector-shaped Piezoelectric Vibrators and a Low-profile Preload Mechanism", issued by the Japan Society of Mechanical Engineers, Robotics and Mechatronics Division, Proceedings of the "2007 JSME Conference on Robotics and Mechatronics", May 10, 2007, pp. 1A2-B01.

Since the ultrasonic vibrators are pressed against a driven body from an inner side in these ultrasonic motors, they have advantages described below, when compared with a motor of a type driving an ultrasonic vibrator from an outside of a rotor as represented by the invention described above.

Since an ultrasonic motor drives a driven body by a frictional force, it is necessary to increase a preload in order to obtain a large drive torque. Due to the operation principle of the ultrasonic motor, however, if an excessive preload is applied, an ultrasonic vibrator is brought into contact with the driven body in the entire circumference of an elliptical motion, resulting in a reduction in drive efficiency. Therefore, the applicable preload has an upper limit, and this determines an upper limit of the torque. Further, a large preload increases wear in a contact point region and reduces the life of the motor.

However, according to a four-point internal contact type ultrasonic motor as shown in FIG. 16, friction forces can be obtained at four points. Further, the same driven body can obtain up to four times greater torque with the same preload, as the torque of the motor is equal to the sum of these friction forces. Conversely, only one-fourth of the preload is required to apply the same torque, suppressing wear in a contact point region and leading to an increase in the life of the motor.

Further, since ultrasonic vibrators are arranged inside a rotor, an installation area can be reduced when a rotor having the same diameter is used. Furthermore, since the ultrasonic vibrators and the rotor are held by a common component, the number of parts can be reduced.

In an ultrasonic motor shown in FIG. 17, sector-shaped ultrasonic vibrators are used. Although vibration modes used are basically similar, one axis of the elliptical motion at contact points between rotor 1 and ultrasonic vibrators 21a, 22a is in the direction of the tangent to rotor 1. Therefore, a large amplitude can be obtained and drive efficiency can be improved, when compared with a case where rectangular ultrasonic vibrators are used.

However, actual fabrication of an ultrasonic motor always involves a machining error. It is difficult to establish contact at four points in the configuration of FIG. 16, resulting in contact at three points, that is, both ends of one ultrasonic vibrator and one end of the other ultrasonic vibrator. Thereby, there occurs a problem that desired performance cannot be exhibited.

A specific description will be given below. It is to be noted that, in the description and drawings below, for the sake of clarity, the description will be given in a two-dimensional plane, and the shape of the ultrasonic vibrators is shown only in outline. Although the description will be given on rectangular-shaped ultrasonic vibrators, the same description applies to sector-shaped ultrasonic vibrators as described above. Further, regarding a mechanism holding the ultrasonic vibrators and pressing them against a rotor, only its function is to be considered, and thus it is abstractly shown using a mark representing a piston.

A description will be given with reference to FIG. 18. Two ultrasonic vibrators 21 and 22 are used to drive rotor 1, which is completely round. The two ultrasonic vibrators 21 and 22 are brought into internal contact with rotor 1 by means of pantograph type preload mechanism 3 interposed therebetween.

As shown in FIG. 18, left ultrasonic vibrator 21 in the drawing is in internal contact with rotor 1. The distance from right ultrasonic vibrator 22 to left ultrasonic vibrator 21 can be changed by preload mechanism 3. Therefore, right ultrasonic vibrator 22 can also be brought into internal contact with rotor 1 at one point. The other ultrasonic vibrator 21 is also in internal contact with rotor 1. If ultrasonic vibrators 21 and 22 ideally have the shape of a rectangle and are arranged in parallel, four-point contact can be established.

Actually, however, as shown in FIG. 19, a machining error in the shape of the ultrasonic vibrators is unavoidable, and the shape of the ultrasonic vibrators is not exactly rectangular in most cases. Further, a deviation in the shape of the ultrasonic vibrators may also occur due to subsequent events such as wear of a contact point.

As a result, as shown in FIG. 19, only one point is in contact with rotor 1, and the other point is away from rotor 1 by a gap d shown in FIG. 19. Therefore, if there occurs a large positional deviation due to the machining error described above, the latter point cannot come into contact with rotor 1 even though it performs the elliptical motion, and thus a desired frictional force may not be able to be obtained.

To solve the above problem, the machining error should be suppressed to allow gap d to be kept in a range smaller than the amplitude of the elliptical motion at the contact point of ultrasonic vibrator 22 described above. Generally, however, the amplitude of the elliptical motion is on the order of submicrons, and the machining accuracy is required to be further smaller than the amplitude. Such an accuracy is in a range that is extremely difficult to achieve with an ordinary processing method such as machining.

As described above, a torque that is only up to three-fourth of a desired torque can be obtained in the ultrasonic motor with the above configuration. Further, regarding the ultrasonic vibrator having only one point in contact with the rotor, a preload is actually concentrated on the one contact point, and the preload is double the preload applied to the opposing ultrasonic vibrator. Therefore, there is concern that the torque and the wear might be further worsened than the desired values described above.

SUMMARY OF THE INVENTION

In view of the aforementioned problems in the background art, one object of the present invention is to provide an ultrasonic motor having ultrasonic vibrators configured to be capable of establishing stable internal contact with a rotor at all four points.

An ultrasonic motor in accordance with the present invention includes a cylindrical rotor for performing a mechanical output, a plurality of ultrasonic vibrators each having two points in internal contact with the rotor, and a preload mechanism for pressing the ultrasonic vibrator from an inside toward an outside of the rotor, and the ultrasonic vibrator is provided to be rotatable relative to the preload mechanism in a plane including the ultrasonic vibrator. Since one rotational degree of freedom is provided, internal contact at four or more points can be established even if there is a machining error.

Further, in the ultrasonic motor in accordance with the present invention, a position about which the ultrasonic vibrator is rotatable is located at a node of vibration of the ultrasonic vibrator. With this configuration, a configuration in which the magnitude of a preload does not adversely affect the drive of the ultrasonic vibrator is implemented.

Further, in the ultrasonic motor in accordance with the present invention, the ultrasonic vibrator has a through hole at the node of vibration, and is held to be rotatable relative to the preload mechanism using a shaft passed through the through hole. With this configuration, it becomes possible to hold the ultrasonic vibrator at the node of vibration without adversely affecting the drive of the ultrasonic vibrator.

Further, in the ultrasonic motor in accordance with the present invention, the ultrasonic vibrator has a rectangular planar shape, and is arranged with a long side surface thereof facing toward the rotor, and a portion of the preload mechanism presses a substantially central portion of a side surface opposite to the long side surface.

With the configuration described above, an ultrasonic motor that requires less machining processes for the ultrasonic vibrators and has less concern for performance degradation can be obtained.

According to the ultrasonic motor in accordance with the present invention, an ultrasonic motor with a good drive efficiency and a long life capable of improving the disadvantages of conventional internal contact type ultrasonic motors and driving at four or more contact points can be provided.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
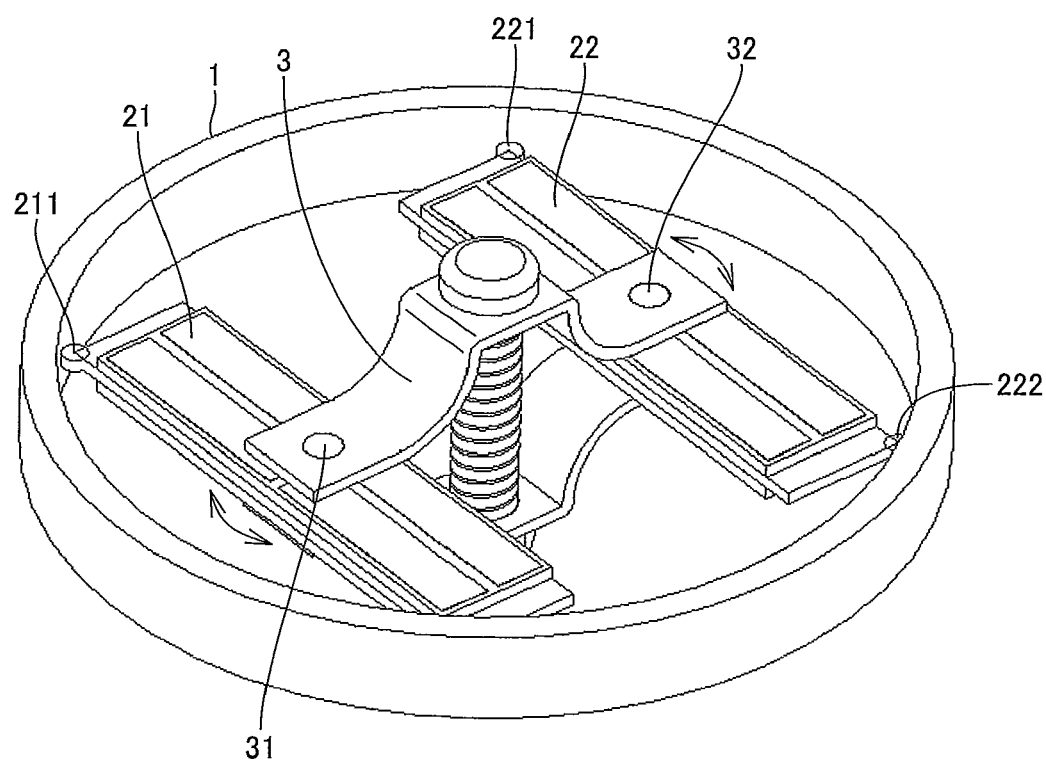
FIG. 1 is an overall perspective view of an ultrasonic motor of a first embodiment.

Hereinafter, structures of an ultrasonic motor in accordance with embodiments of the present invention will be described. It is to be noted that identical or corresponding parts will be designated by the same reference numerals, and the description thereof may not be repeated.

Further, when a number, amount, or the like is referred to in the embodiments described below, the scope of the present invention is not necessarily limited to the number, amount, or the like that is referred to, unless otherwise specified.

Figure 19:
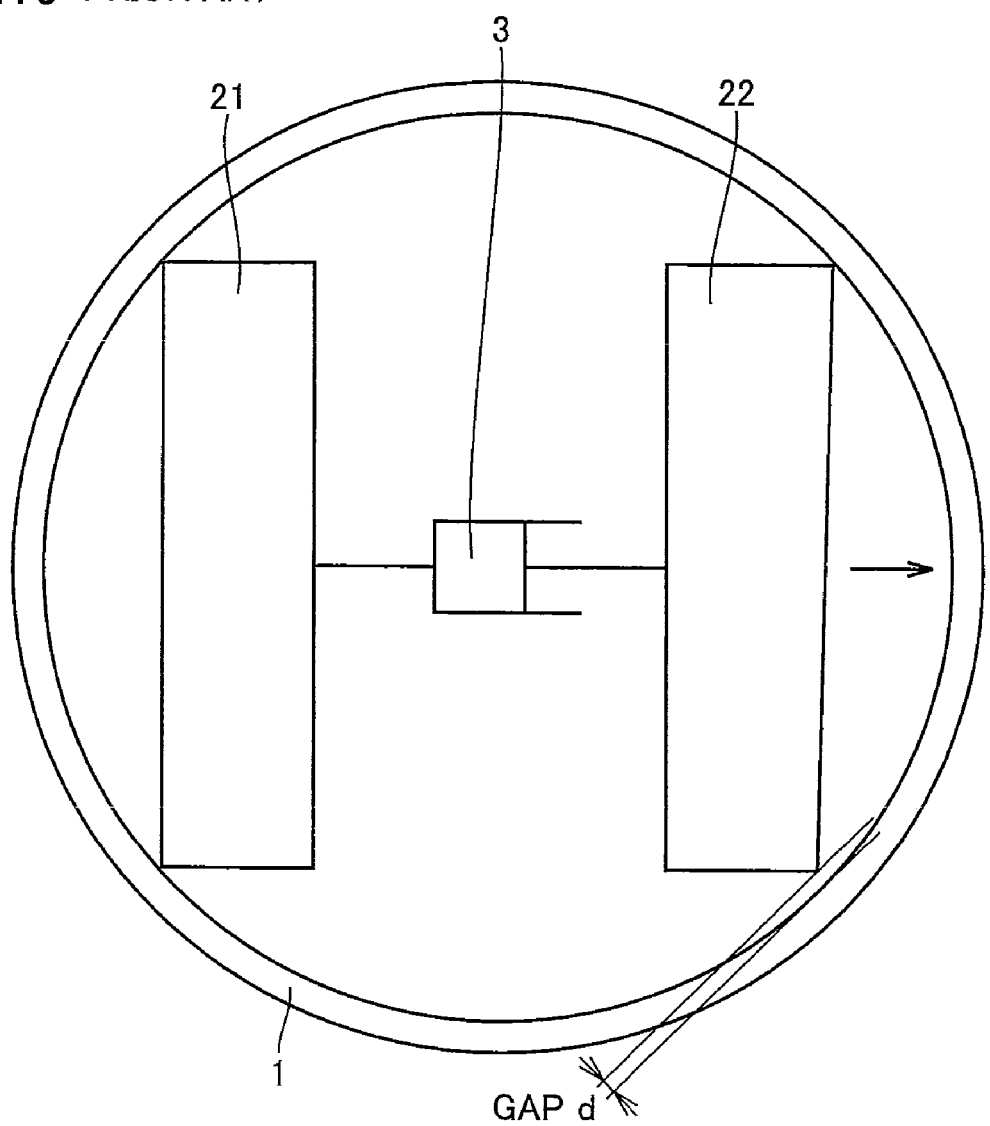
FIG. 19 is a schematic view showing a problem in the internal contact type ultrasonic motor of the background art.

Furthermore, the ultrasonic motor of the present invention relates to the arrangement of ultrasonic vibrators and a rotor and the exchange of frictional forces, and the present invention is applicable to any ultrasonic motor of a type in which two ultrasonic vibrators are in internal contact with a cylindrical rotor at two points and drive the rotor. Therefore, configurations described in the embodiments are merely exemplary, and the shape of the ultrasonic vibrators, for example, is not limited thereto. The present invention is also applicable, for example, to an ultrasonic motor using sector-shaped ultrasonic vibrators as shown in FIG. 19.

First Embodiment

A configuration of an ultrasonic motor of a first embodiment will be described with reference to FIGS. 1 to 4. Two ultrasonic vibrators 21 and 22 are in internal contact with a cylindrical rotor 1 via contact points 211, 212 (not shown), and contact points 221, 222, respectively.

Ultrasonic vibrators 21 and 22 are pressed against rotor 1 by means of preload mechanism 3 to be pushed and expanded outward. Ultrasonic vibrator 21 performs an elliptical motion as described with reference to FIG. 16 by receiving the above-mentioned alternating voltages φA, φB with the phases being shifted by 90°.

Figure 16:
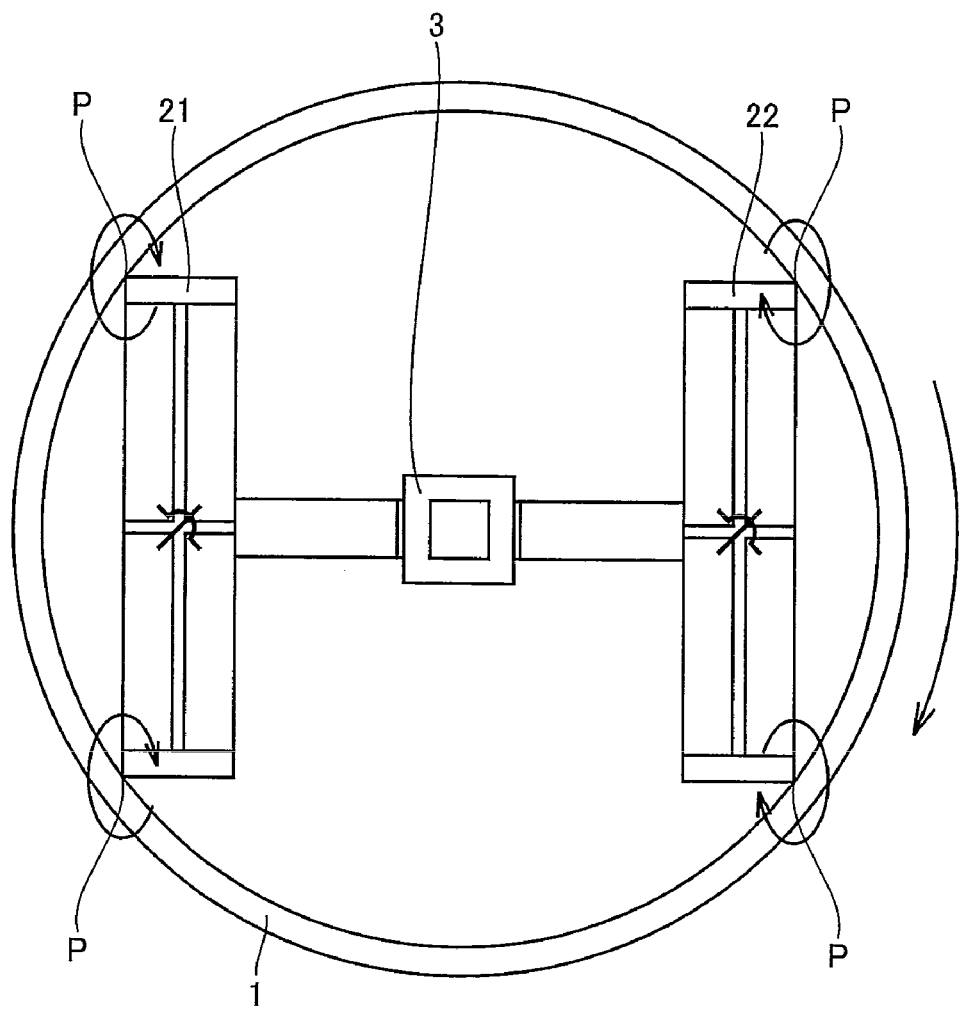
FIG. 16 is a schematic view illustrating a drive structure of the internal contact type ultrasonic motor of the background art.

Ultrasonic vibrator 22 has a configuration in which electrodes are arranged in mirror symmetry with those of ultrasonic vibrator 21, and performs an elliptical motion as described with reference to FIG. 16 by receiving the above-mentioned alternating voltages φA, φB with the phases being shifted by 90°. That is, all contact points in internal contact with rotor 1 perform the elliptical motion that causes rotor 1 to rotate in an identical direction (in FIG. 16, in a clockwise direction).

[Preload Mechanism and Ultrasonic Vibrator Holding Mechanism]

Figure 2:
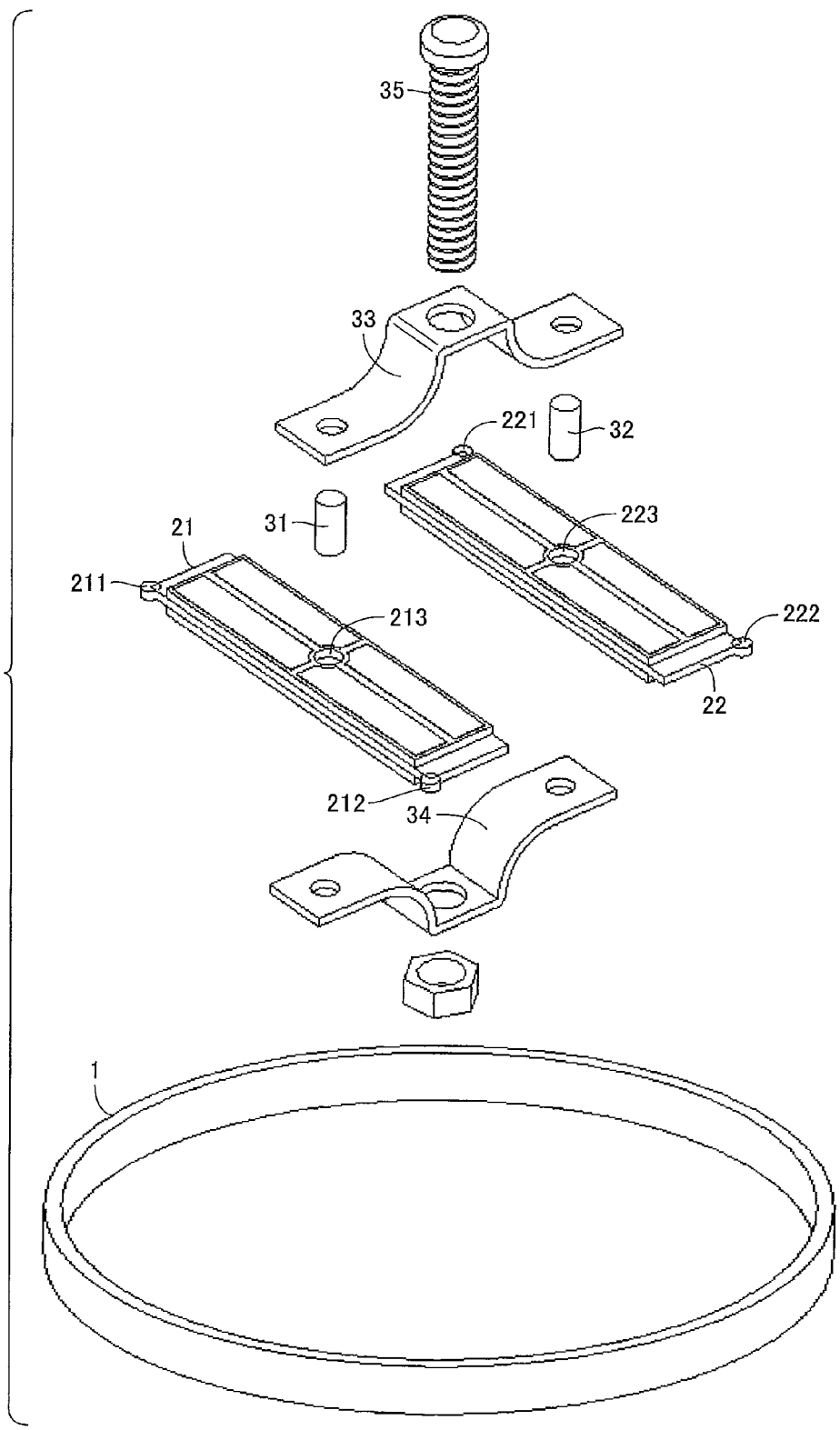
FIG. 2 is an exploded perspective view of the ultrasonic motor of the first embodiment.

Referring to FIG. 2, the preload mechanism and an ultrasonic vibrator holding mechanism will be described. Ultrasonic vibrators 21 and 22 are provided with through holes 213 and 223, respectively, in the centers thereof. Shafts 31 and 32 are passed through the holes, respectively, and an upper pantograph 33 and a lower pantograph 34 in preload mechanism 3 hold upper ends and lower ends of the shafts, respectively.

The interval between upper pantograph 33 and lower pantograph 34 can be changed by an adjusting screw 35, and when the interval is reduced, the pantographs are expanded. Further, in a state where ultrasonic vibrators 21 and 22 are in contact with the rotor, the preload to rotor 1 is increased. Conversely, when the interval is expanded, the preload is reduced.

Since shafts 31 and 32 have a circular cross sectional shape substantially identical to that of through holes 213 and 223 in ultrasonic vibrators 21 and 22, ultrasonic vibrators 21 and 22 are rotatable about the respective through holes. In principle, it is not essential that both ultrasonic vibrators 21 and 22 are rotatable, and the requirements of the present invention are satisfied as long as one of them is rotatable.

There are some cases where an excess movable portion is preferably eliminated, as it may contribute to deterioration in the performance of the ultrasonic motor due to backlash or the like. In this case, it is satisfactory as long as one of the through holes in ultrasonic vibrators 21 and 22 is bonded to the shaft. Conversely, there are some cases where both ultrasonic vibrators 21 and 22 are preferably held in the same condition, as the possibility of generating an unintended vibration is reduced when the motor has a better symmetrical property.

[Principle of Establishing Four-Point Contact]

Figure 3:
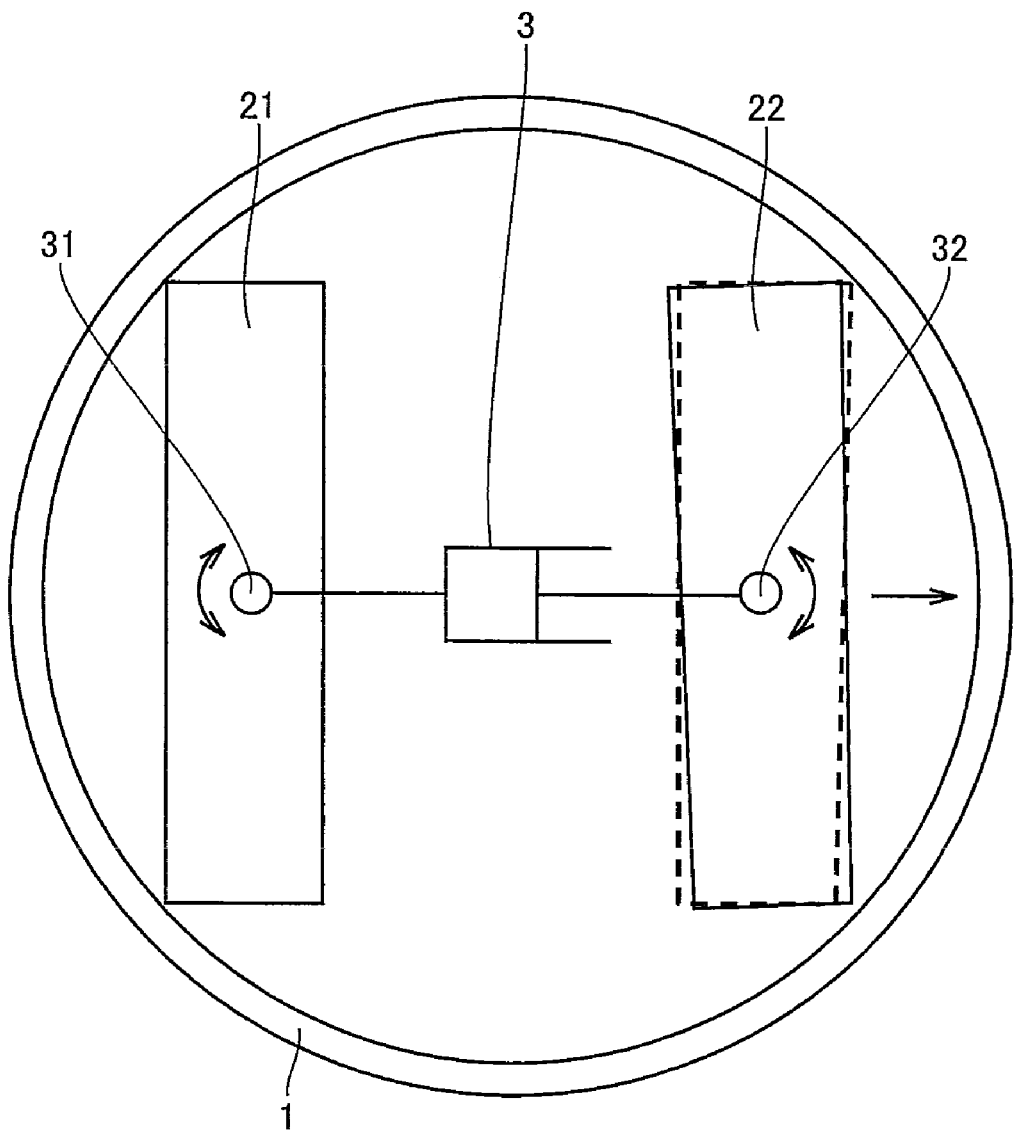
FIG. 3 is a schematic view illustrating four-point contact in the ultrasonic motor of the first embodiment.

A principle of establishing four-point contact will be described with reference to FIG. 3. In a state where only one point of ultrasonic vibrator 22 is in contact with rotor 1 as shown in FIG. 3, the distance between the both ultrasonic vibrators is further expanded using preload mechanism 3. Ultrasonic vibrator 22 has a rectangular planar shape, and is arranged with a long side surface thereof facing toward rotor 1. A portion of preload mechanism 3 presses a substantially central portion of a side surface opposite to the long side surface.

Ultrasonic vibrator 22 rotates about shaft 32 in a plane including ultrasonic vibrator 22, and thereby contact is established at two points. Since the rotation about shaft 32 is passively performed along with the pressing and expanding operation of preload mechanism 3 on this occasion, the function described in the present invention can be achieved without performing any special operation.

[Influence on Vibration Modes]

Since a pressure toward an outside of rotor 1 is applied to through holes 213 and 223, the pressure may interfere with the vibrations of ultrasonic vibrators 21 and 22. Accordingly, through holes 213 and 223 shown in FIG. 2 described above are provided in the centers of ultrasonic vibrators 21 and 22, which are nodes of the two vibration modes and positions having the smallest vibration. With this configuration, the vicinities of the through holes hardly vibrate, and thus the influence caused by holding ultrasonic vibrators 21 and 22 by means of shafts 31 and 32 using these positions is minimized.

[Shape of Ultrasonic Vibrators]

Figure 17:
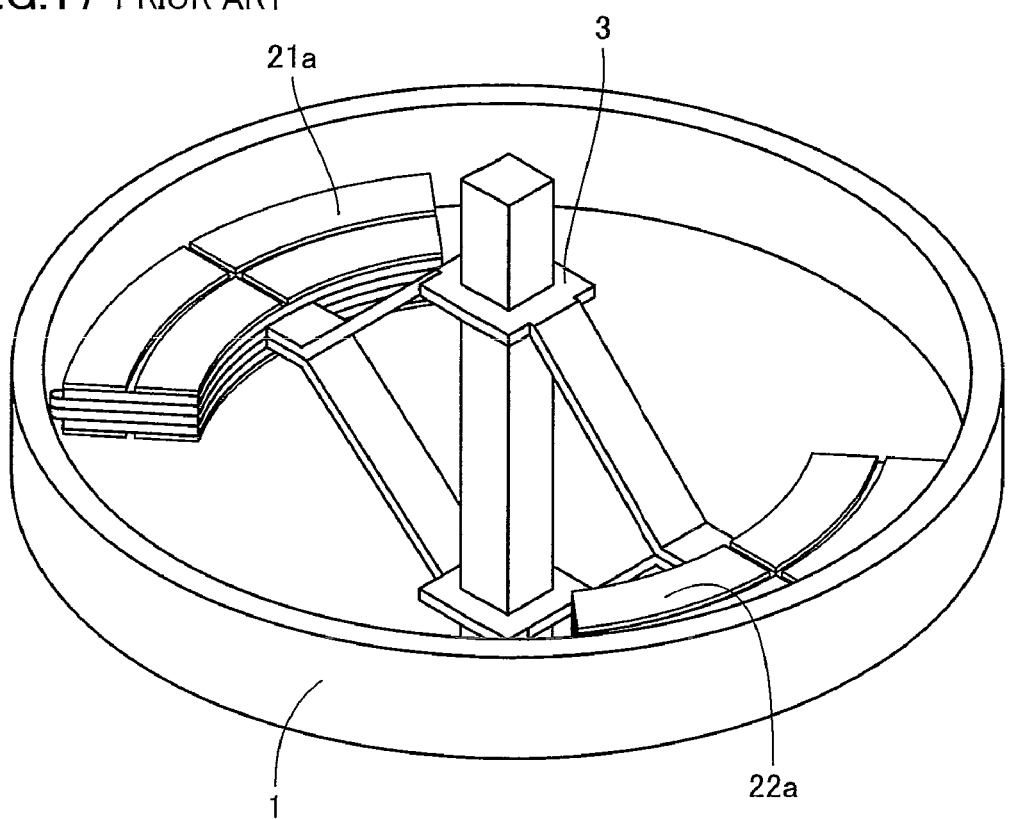
FIG. 17 is an overall perspective view showing a structure of an internal contact type ultrasonic motor of the background art employing sector-shaped ultrasonic vibrators.
Figure 18:
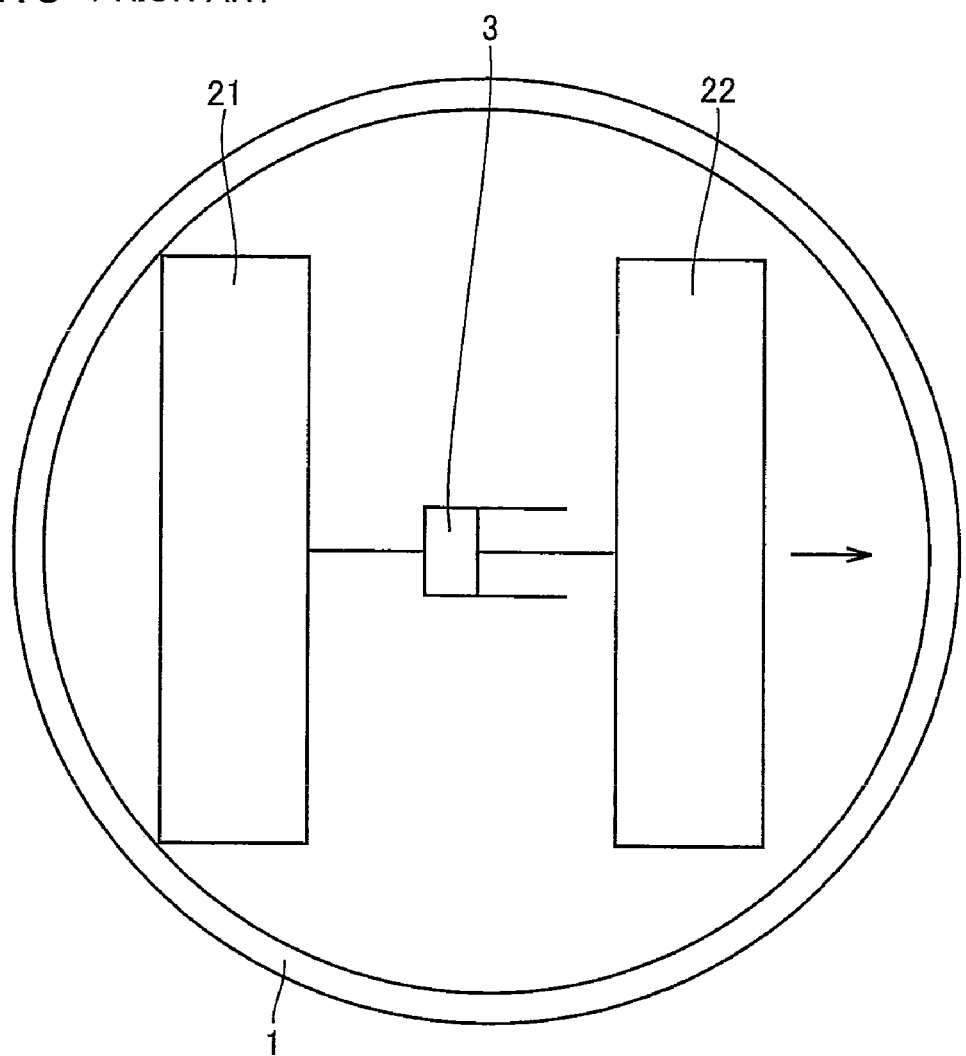
FIG. 18 is a schematic view showing a function of the internal contact type ultrasonic motor of the background art.

In the present embodiment, for the sake of clarity, rectangular-shaped ultrasonic vibrators has been described. However, the essence of the present invention lies in the fact that internal contact of the ultrasonic vibrators with the cylindrical rotor at four points, which has been practically difficult to achieve, can be implemented by newly providing one rotational degree of freedom to the ultrasonic vibrator. That is, the present invention is applicable to any ultrasonic motor in which internal contact at four or more points is desired. A similar effect can also be obtained, for example, in an ultrasonic motor using sector-shaped ultrasonic vibrators as shown in FIG. 17.

Figure 4:
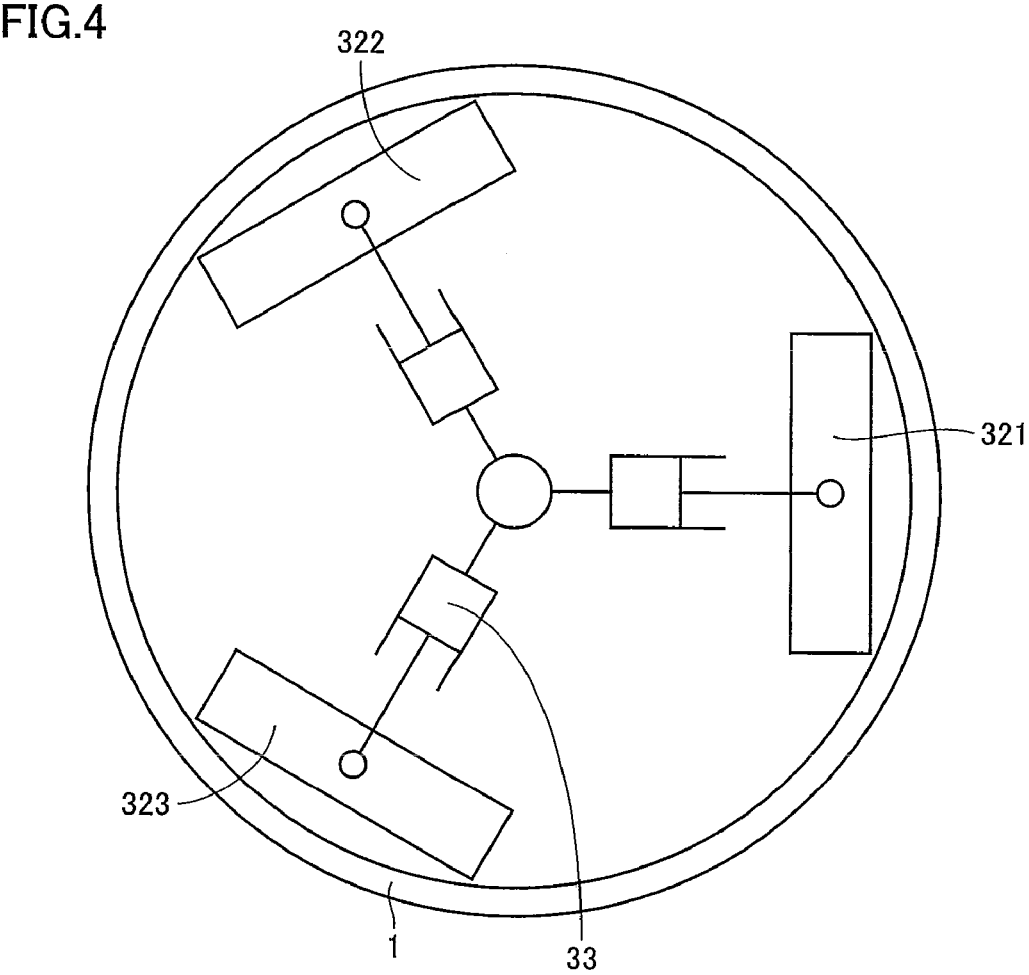
FIG. 4 is a schematic plan view showing another form of the ultrasonic motor of the first embodiment.

Further, as long as a mechanism expanding/contracting in a radial direction of the rotor with one degree of freedom is combined with ultrasonic vibrators held by the mechanism via mechanisms rotatable with one degree of freedom, an ultrasonic motor having three ultrasonic vibrators 321, 322, and 323 to which a preload is applied outward by a preload mechanism 3 as shown in FIG. 4, or an ultrasonic motor including four or more ultrasonic vibrators can also be employed.

[Shape of Preload Mechanism]

Similarly, it is to be understood that, as long as pantograph type preload mechanism 3 for applying a preload is formed such that a component serving a role to apply a pressure to two ultrasonic vibrators toward the outside of rotor 1 holds rotatable axes of rotation provided to the ultrasonic vibrators, the effect of the present invention can be obtained regardless of the configuration or structure thereof.

[Rotor]

The rotor is also not limited to that described in the present embodiment. For example, a configuration in which a groove for preventing falling-off of the rotor is provided inside rotor 1 can also be employed. Further, the present invention is also applicable to an ultrasonic motor using a rectangular groove instead of a rotator.

Second Embodiment

A configuration of an ultrasonic motor of a second embodiment will be described with reference to FIGS. 5 to 9. For the sake of clarity, components identical to those of the embodiment described above will be designated by the same reference numerals, and the description thereof will not be repeated.

[Overall Configuration]

Figure 5:
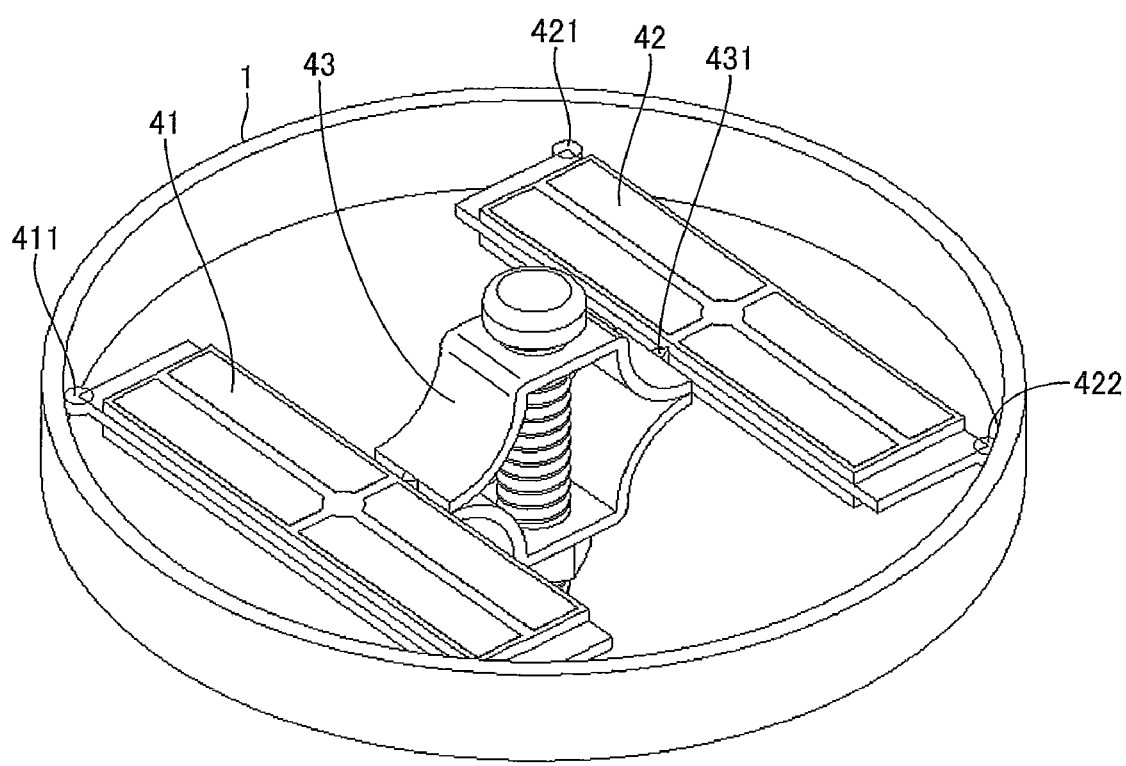
FIG. 5 is an overall perspective view of an ultrasonic motor of a second embodiment.
Figure 6:
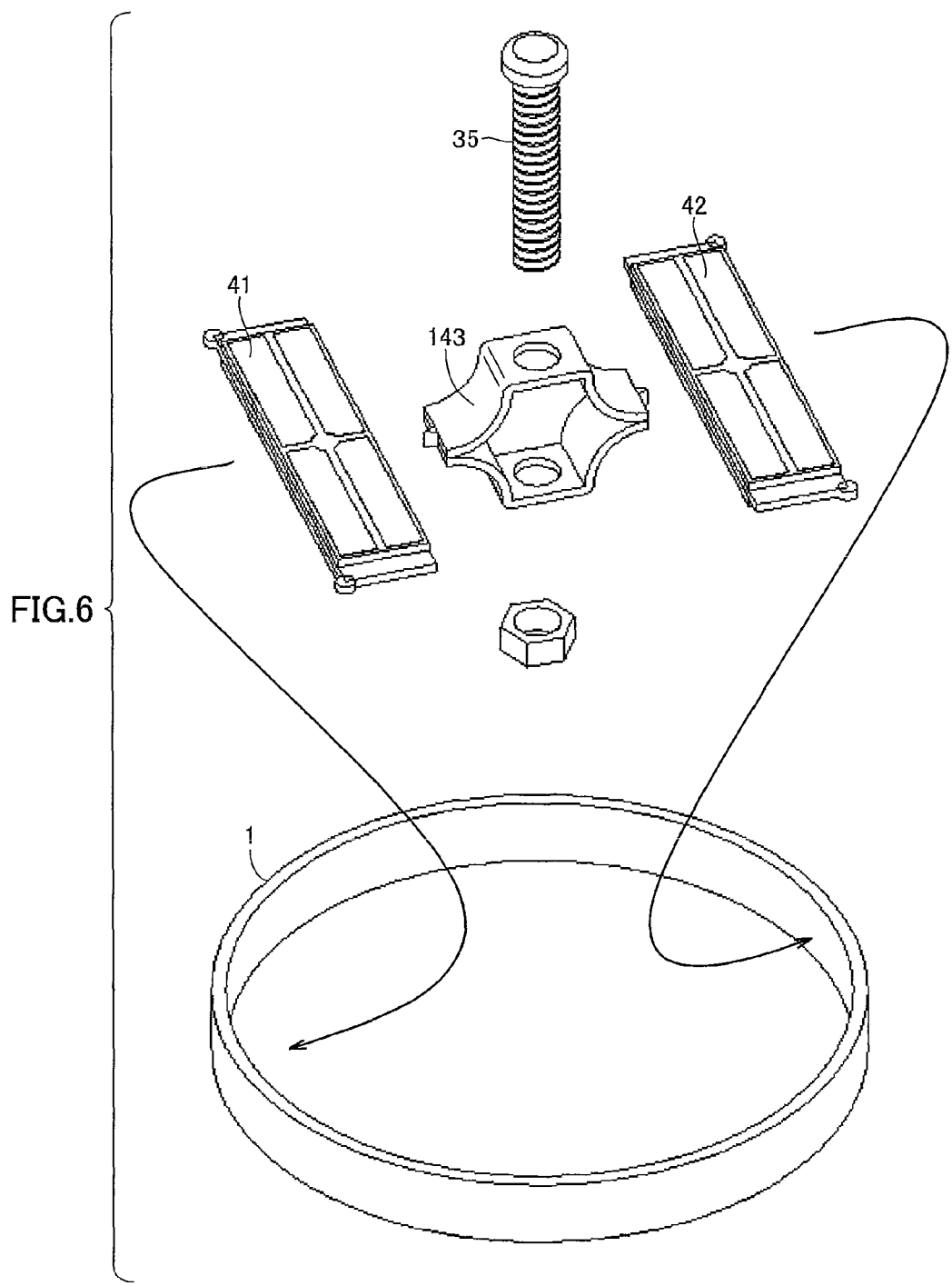
FIG. 6 is an exploded perspective view of the ultrasonic motor of the second embodiment.

As shown in FIGS. 5 and 6, ultrasonic vibrators 41 and 42 are configured to be pushed and expanded toward the outside of rotor 1 by means of a pantograph type preload mechanism 43 having projections 431, and are in internal contact with rotor 1. As for the rest, ultrasonic vibrators 41 and 42 are configured in the same way as those in the first embodiment.

[Ultrasonic Vibrators]

Figure 7:
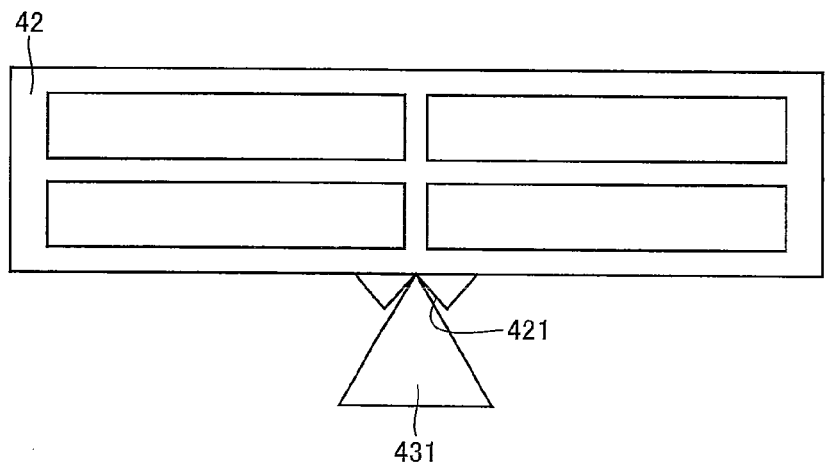
FIG. 7 is a schematic view showing a structure of an ultrasonic vibrator holding portion employed in the ultrasonic motor of the second embodiment.

Since ultrasonic vibrators 41 and 42 are in mirror symmetry with each other, only ultrasonic vibrator 42 will be described below with reference to FIG. 7. Ultrasonic vibrator 42 has a recess 421 at a central portion of a side surface thereof. This can determine the position of projection 431 relative to ultrasonic vibrator 42 at the time of assembly. Further, this can also prevent deviation of the position of projection 431 relative to ultrasonic vibrator 42 when an external force is applied to ultrasonic vibrator 42.

Since projection 431 is in line contact with ultrasonic vibrator 42 as described above, ultrasonic vibrator 42 can perform a rotational motion about a contact line thereof. Further, the line contact can prevent ultrasonic vibrator 42 from falling toward an out-of-plane direction.

Figure 8:
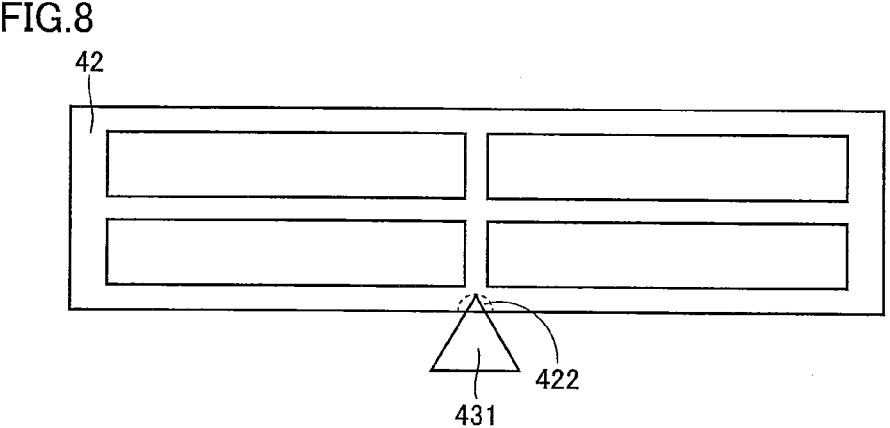
FIG. 8 is a schematic view showing another structure of the ultrasonic vibrator holding portion employed in the ultrasonic motor of the second embodiment.
Figure 9:
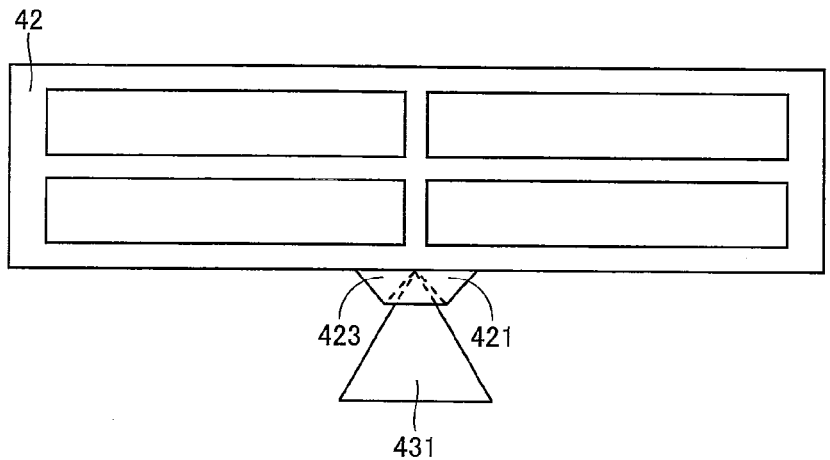
FIG. 9 is a schematic view showing still another structure of the ultrasonic vibrator holding portion employed in the ultrasonic motor of the second embodiment.
Figure 10:
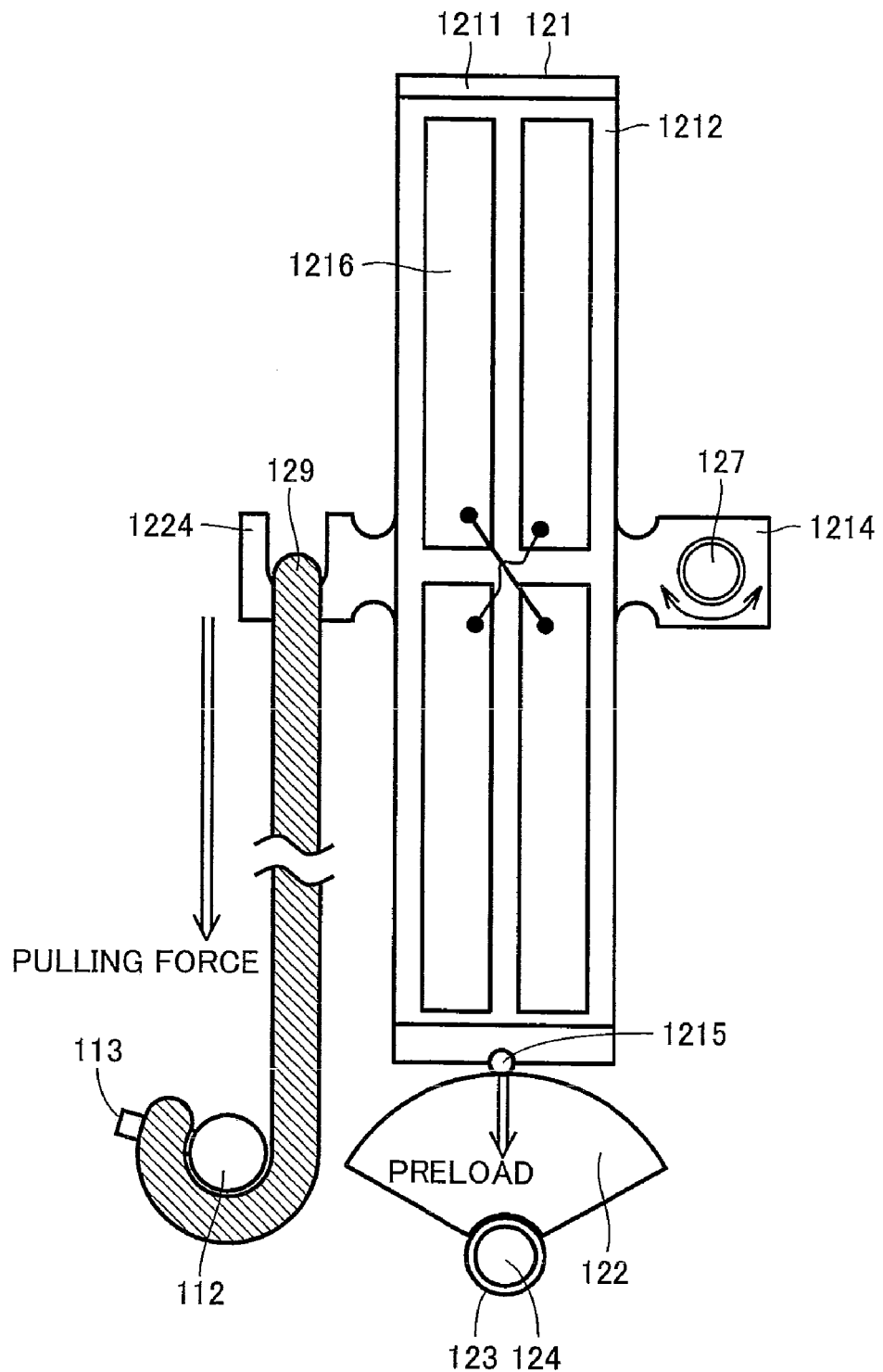
FIG. 10 is a plan view showing an exemplary configuration of a resonance ultrasonic motor of the background art.
Figure 11:
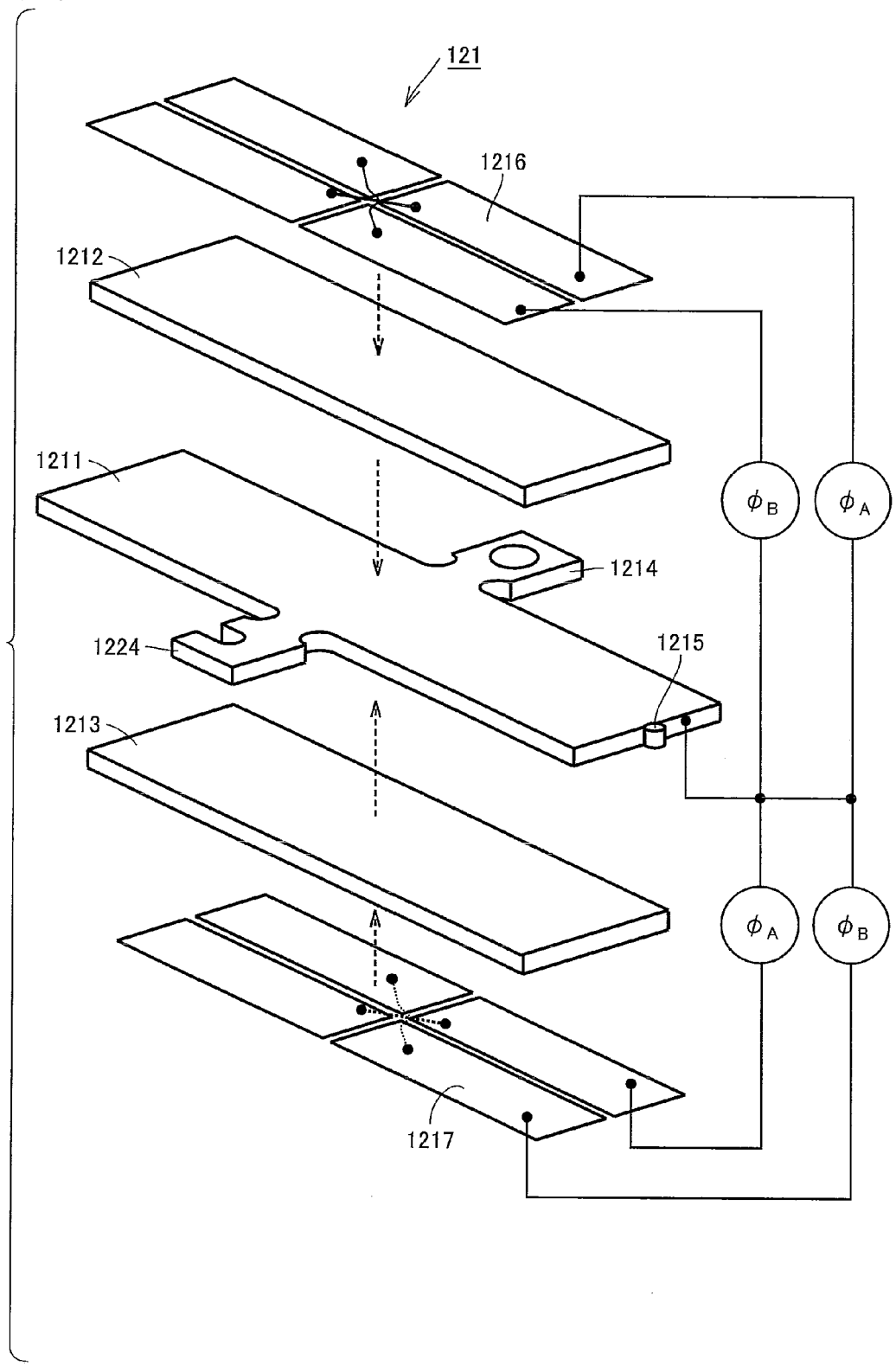
FIG. 11 is an exploded perspective view showing an exemplary configuration of an ultrasonic vibrator used in the resonance ultrasonic motor of the background art.
Figure 12:
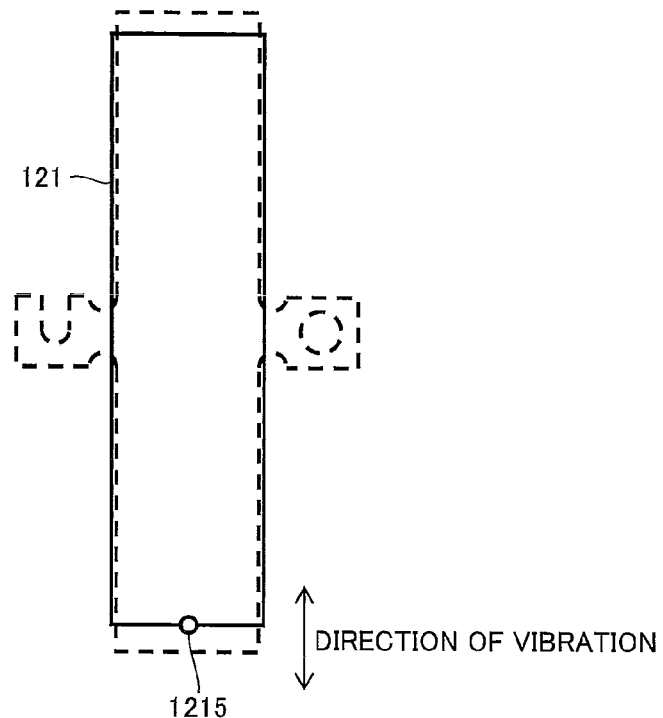
FIG. 12 is a schematic view showing one vibration mode of the ultrasonic vibrator of FIG. 11.

Projection 431 may be positioned in a recess 422 provided in ultrasonic vibrator 42 itself as shown in FIG. 8, as long as the two vibration modes described in the background art can have an identical resonance frequency. Further, to prevent the falling of ultrasonic vibrator 42 more reliably, a pair of covers 423 sandwiching projection 431 from above and below may be provided as shown in FIG. 9.

According to the configuration of the present embodiment, ultrasonic vibrator 42 is supported by projection 431 to be rotatable with one degree of freedom, and thus four-point contact can be maintained without requiring any special operation, as in the first embodiment described above.

Figure 13:
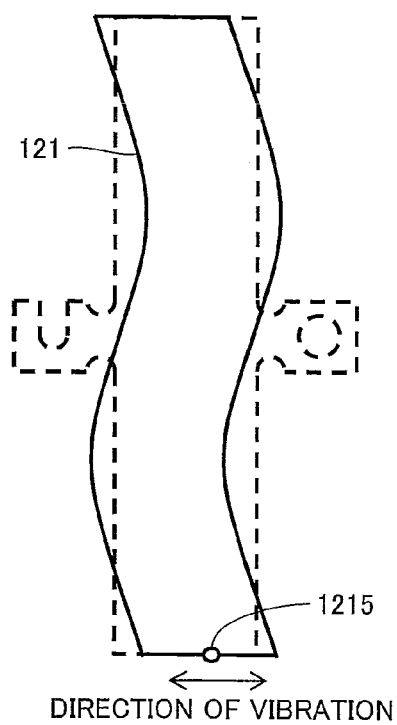
FIG. 13 is a schematic view showing another vibration mode of the ultrasonic vibrator of FIG. 11.
Figure 14:
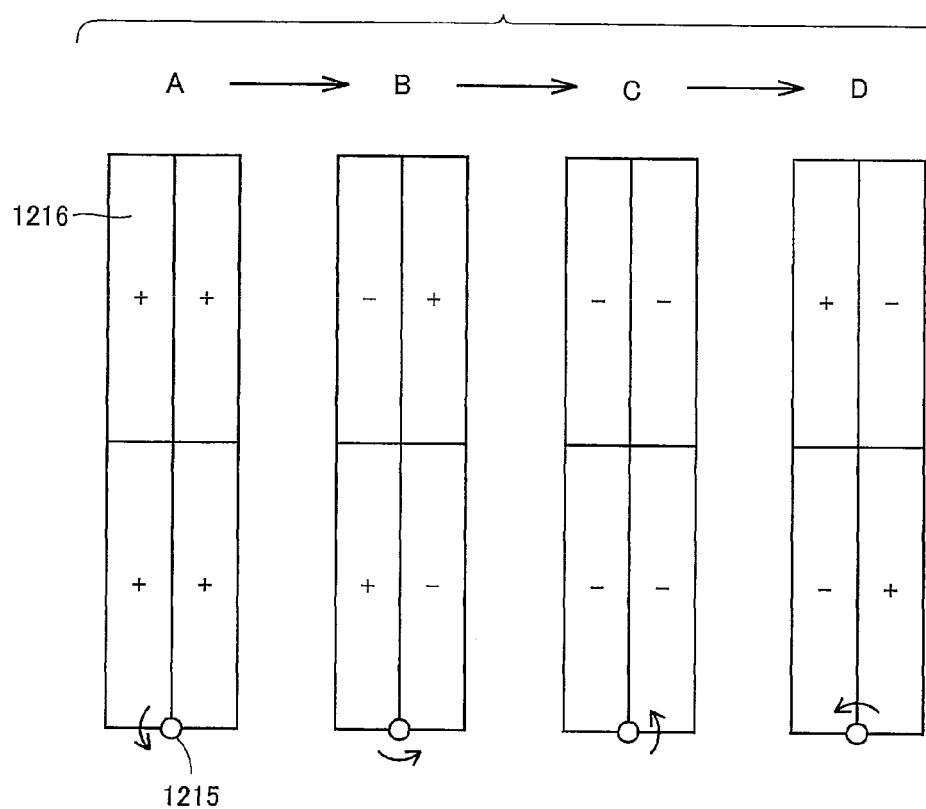
FIG. 14 is a view illustrating an elliptical motion of the ultrasonic vibrator of FIG. 11.
Figure 15:
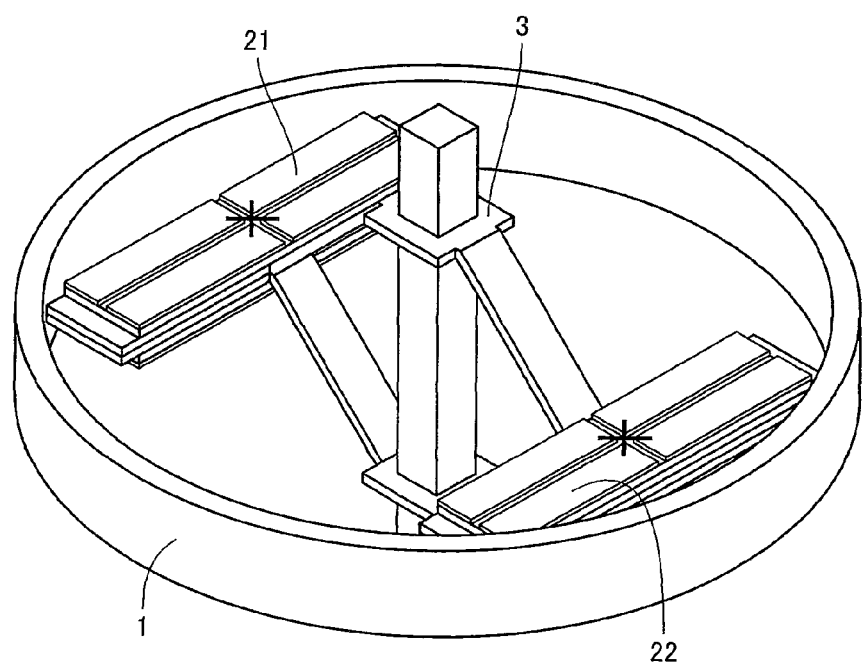
FIG. 15 is an overall perspective view showing a structure of an internal contact type ultrasonic motor of the background art.

In the present embodiment, the center of rotation of the rotational motion with one degree of freedom is located on the side surface of ultrasonic vibrator 42. Since the center of rotation is not located at the node of vibration for the bending vibration shown in FIG. 13, there is a possibility that the bending vibration may be affected. However, when compared with the configuration of the first embodiment in which through holes are provided in the ultrasonic vibrators, the configuration of the present embodiment can achieve a more rational holding structure, requires simpler machining processes, and has a lower risk of generating a defect in an element.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An ultrasonic motor, comprising:
   a cylindrical rotor for performing a mechanical output;
   a plurality of ultrasonic vibrators each having two points adapted to be in internal contact with said rotor;
   a preload mechanism for pressing at least one of said ultrasonic vibrators from an inside toward an outside of said rotor; and
   a torque dividing mechanism holding said at least one of said ultrasonic vibrators with a torque applied from said preload mechanism to said at least one of said ultrasonic vibrators being divided,
   said at least one of said ultrasonic vibrators being held by said torque dividing mechanism to be rotatable relative to said preload mechanism in a plane including said at least one of said ultrasonic vibrators.

2. The ultrasonic motor according to claim 1, wherein a position about which said at least one of said ultrasonic vibrators is rotatable is located at a node of vibration of said at least one of said ultrasonic vibrators.

3. The ultrasonic motor according to claim 1, wherein said at least one of said ultrasonic vibrators has a through hole at the node of vibration, and is held to be rotatable relative to said preload mechanism using a shaft passed through the through hole.

4. The ultrasonic motor according to claim 1, wherein
   said at least one of said ultrasonic vibrators has a rectangular planar shape, and is arranged with a long side surface thereof facing toward said rotor, and
   a portion of said preload mechanism presses a substantially central portion of a side surface opposite to said long side surface.

5. An ultrasonic motor, comprising:
   a cylindrical rotor for performing a mechanical output;
   a plurality of ultrasonic vibrators each having two points adapted to be in internal contact with said rotor; and
   a preload mechanism for pressing at least one of said ultrasonic vibrators from an inside toward an outside of said rotor, said preload mechanism including a pair of opposing pantographs and an adjusting screw for selectively changing a distance between the pair of opposing pantographs to adjust a position of said at least one of said ultrasonic vibrators with respect to said cylindrical rotor, said at least one of said ultrasonic vibrators being provided to be rotatable relative to said preload mechanism in a plane including said at least one of said ultrasonic vibrators.

6. The ultrasonic motor according to claim 5, wherein each of said pair of opposing pantographs has a hole, and said adjusting screw is inserted through the hole.

7. The ultrasonic motor according to claim 4, wherein a recess is formed in said surface opposite to said long side surface for receiving said portion of said preload mechanism.

8. The ultrasonic motor according to claim 7, wherein a cover for covering said recess is provided to prevent said portion of said preload mechanism from falling off said recess.

* * * * *